PROCESS FOR THE PREPARATION OF THIURAM MONOSULFIDES

William R. Trutna, Pasadena, Tex., assignor to E. I. du Pont de Nemours and Company, Wilmington, Del., a corporation of Delaware
No Drawing. Filed Jan. 6, 1961, Ser. No. 80,980
1 Claim. (Cl. 260—567)

This invention relates to the preparation of thiuram monosulfides.

The preparation of thiuram monosulfide by phosgenation of a dithiocarbamic acid metal salt is known. This process is disclosed, for example, in Williams and Croco, United States Patent No. 2,048,043, issued July 21, 1936. The disclosure of that patent is herein incorporated by reference in its entirety.

According to the present invention, conversion yields based on the dithiocarbamic acid salt reactant in the above process are significantly increased. Yields based on phosgene introduced are also greatly improved.

The process of this invention involves carrying out the above reaction while diluting the phosgene introduced into the reaction with an inert gaseous diluent. As long as it is inert, i.e., substantially unreactive with the reactants and product formed in the reaction, the choice of diluent is not particularly critical. For convenience and economy, air is extremely suitable and preferred. Other inert gases, such as nitrogen, carbon monoxide, neon, argon, and the like, can be used.

When the phosgene introduced into the reaction is diluted with as little as 0.5 part by volume of diluent per part of phosgene, remarkably improved yields are observed. Amounts above an equal part by volume of diluent are preferred. While dilution as great as 500 to 1 volume can be used, particular advantages are obtained at less than 250 to 1. Operation in the range between 4 to 1 and 40 to 1 are particularly preferred.

The phosgene will be used preferably in at least a stoichiometric amount required to react with the dithiocarbamate. Particularly excellent results are obtained when excess phosgene is used, up to say about a 25% by weight excess over stoichiometric.

Reaction temperatures between 10° and 100° C. are satisfactory. The reaction is exothermic and can conveniently begin at ambient temperature of say 25° C. It is preferred to hold the temperature of the reaction mass below about 65° C. by application of external cooling, and a temperature of about 40° C. during the phosgene addition effects excellent results. Completion of the reaction after the phosgene addition can be promoted by elevation of the temperature to about say 80° to 95° C. for a hold time to complete formation of the thiuram monosulfide.

The completion of the reaction referred to above can be carried out either batchwise or continuously. Sparging of the reaction mixture with an inert gas will reduce the temperature or time or both temperature and time required for completion of the reaction.

The reaction can be carried out at atmospheric pressure, although pressures up to say 5 inches of water are convenient and aid in efficient closed-system operation.

The order of addition of reactants is not particularly critical, although in a batch operation it is preferred to add the diluted phosgene to an aqueous solution of about 5 to 40% by weight of the dithiocarbamic acid salt. In a continuous reaction, simultaneous addition of phosgene and aqueous acid salt will, of course, be practiced. Since solids are formed in the reaction, resulting in a slurry, stirring or agitation will promote the reaction efficiency.

As disclosed in the aforementioned Williams and Croco patent, the salt of dithiocarbamic acid, and the ester intermediate, and the monosulfide product, can be substituted on the nitrogen atom with same or different alkyl, aralkyl or aryl substituents. The acid salts, solvents, and reaction conditions disclosed in that patent can generally be used, provided dilution of the phosgene is carried out in accordance with the present invention. The sodium, potassium, and ammonium salts of monomethyl dithiocarbamic acid, monoethyl dithiocarbamic acid, dimethyl dithiocarbamic acid, diethyl dithiocarbamic acid, and methylethyl dithiocarbamic acid will be used most frequently. The reaction apparently proceeds by formation of the corresponding dithiocarbamic acid ester, which in turn is decomposed at the operating temperatures, with faster and more complete decomposition at increased temperatures, to evolve gaseous carbon oxysulfide and yield the desired thiuram monosulfide.

BATCH PROCESS

In a preferred batch process according to this invention, an aqueous solution of the selected substituted dithiocarbamate at room temperature is placed in a suitable reactor or vessel which can be open or closed. It should be adapted for temperature control by external heating or cooling means, as an electric refrigeration coil or circulating cold water system. It can be adapted for pressure control if desired. If the vessel is closed or pressure equipped, suitable provision must, of course, be made, as by venting, for escape or removal of evolved gaseous carbon oxysulfide as mentioned above.

Through one or more suitable inlets preferably at or near the bottom of the vessel, there is introduced a gaseous stream of the desired amount of phosgene, also at room temperature and suitably diluted according to this invention with say from 4 to 40 volumes of air for each volume of phosgene. Addition of the diluted phosgene is as rapid as possible without causing excess foaming of the contents of the vessel. The contents of the vessel are stirred throughout the process. Heat of the reaction raises the temperature of the mass and it is held below about 50° C. while addition of diluted phosgene continues.

Addition of diluted phosgene is continued until substantially all of the starting dithiocarbamate salt has been reacted. This can readily be determined by any convenient method. One such method is known as the iron spot method and is carried out by placing a sample drop of the reaction mass on a piece of ordinary filter paper adjacent a spot of a suitable iron compound reactive with the starting dithiocarbamate but not reactive with its conversion products. A suitable compound is ferric chloride. If the sample still contains some of the starting dithiocarbamic acid salt, reaction with the ferric chloride will cause precipitation of a black ferric dithiocarbamate salt. A brownish result means most of the acid salt has been converted and a small amount remains unconverted. Substantially no reaction and no color change on the filter paper indicates that the sample contains none of the starting dithiocarbamic acid salt.

When there is substantially no dithiocarbamic acid salt remaining in the vessel, the temperature of the contents of the vessel is permitted to increase, or is increased to above 50° C. and preferably to as high as 80° to 95° C. At this higher temperature, evolvement of the composition vapors, in particular carbon oxysulfide, is hastened and brought to completion by a suitable holding period, the duration of which will depend on the quantity of mass, temperature, proportion of ingredients, etc. Left in the vessel is an aqueous slurry of substantially 100% pure corresponding thiuram monosulfide, representing a yield of substantially 100% based on the beginning dithiocarbamic acid salt. Recovery of solid powder product from the aqueous slurry is readily accomplished by filtration or centrifugation and drying of the resulting solid product.

CONTINUOUS PROCESS

In a preferred continuous process according to this invention, liquid aqueous dithiocarbamic acid salt is introduced into one end of a temperature-controllable reaction zone or series of zones, as in a column reactor. Into the opposite end of the zone or series of zones is fed a stream of gaseous diluted phosgene. These two feed streams of reactants will pass in countercurrent flow, thereby affecting contact and reaction between the phosgene and the acid salt. The temperature throughout will be in the range of 10° to 100° C. with a descending temperature gradient from the phosgene inlet end to the acid salt inlet end. The ester reaction product is continuously drawn off from the phosgene inlet end and converted to the desired thiuram monosulfide by holding at an elevated temperature for a short time as described above. The monosulfide product is recovered after hold up in the same manner as in the batch operation.

The present invention can be carried out using conventional apparatus. Continuous or intermittent operations can be readily affected in conventional liquid-gas reactors, designed for countercurrent or co-current flow of reactants and provided with suitable mixing devices if needed. Suitable apparatus includes a column reactor, for example, a sieve plate or bubble cap plate column reactor, or a pipeline type of reactor such as a pipeline mixer or a turbannular reactor, or any other suitable single or multi-stage reactor.

Particular advantages are obtained using a column reactor of a plurality of zones say from 4 to 30, where the aqueous solution of the acid salt is fed to the top of the column at a temperature of about 15° to 30° C. and the air-diluted phosgene is fed into the bottom of the column at ambient temperature. Alternatively, uniquely beneficial results are obtained when substantially 100% air is fed to the bottom of the column, and the appropriate amount of phosgene is introduced at one or more, or at each, of the zones in the column. Suitable mixing devices such as twisting vanes or plate orifices can be used in one or more or in each of the zones as desired or as found necessary to affect proper admixing in order to obtain intimate contact between the reactants. Other types of suitable equipment for the practice of this invention will readily occur to persons skilled in the art.

The following examples are given in addition to those above in order to further illustrate the invention and are not intended to be limiting.

Example 1

550 grams of 42% aqueous sodium dimethyldithiocarbamate are charged into a laboratory flask and diluted with 1742 grams of water. The contents of the flask are agitated vigorously by a paddle stirrer and the addition of phosgene is started with the flask contents at ambient temperature, 25° C. Phosgene admixed with air in a ratio of 10 volumes air to 1 volume phosgene is introduced through an 8 millimeter diameter gas inlet tube several centimeters below the liquid surface. After 90.5 grams of phosgene has been added, the iron spot test indicates that all of the sodium dimethyldithiocarbamate has been reacted. The phosgene addition is stopped at which time the reaction temperature is 40° C. The reaction flask is heated to 50° C. and the product slurry filtered. The filter cake is dried and weighed. The 156 grams of product tetramethyl thiuram monosulfide has a melting point of 108° C. The resultant yields of sodium dimethyldithiocarbamate and phosgene are 93% and 82% respectively.

Example 2

Into the top of an eight stage six inch diameter sieve plate column reactor is fed a 10% aqueous solution of dimethyldithiocarbamic acid, sodium salt, at a rate of 2500 pounds per hour and at room temperature. Simultaneously, into each of the eight stages is fed 12 pounds of gaseous phosgene per hour. Into the bottom stage is introduced air at the rate of 35 pounds per hour and this is admixed with the phosgene by means of orifice mixers associated with each plate. The temperature in the bottom stage is about 50° C. and the temperature decreases fairly uniformly to a temperature of 28° C. in the top stage.

From the bottom of the column is drawn off continuously a mixture of the product thiuram monosulfide and the dimethyldithiocarbamic acid ester at a temperature of 50° C. The material drawn off from the bottom is fed continuously to a pot reactor with a hold-up time of 30 minutes. The temperature is maintained at 70° C. and air is introduced into the liquid at a rate of 30 cubic feet per minute. The final product is obtained at a rate of 170 pounds per hour with an excellent yield of substantially pure tetramethyl thiuram monosulfide.

Other examples can be carried out by repeating the above examples and substituting other reactants, ingredients and process conditions described above within the scope of this invention and within the limits and ranges set forth herein, as will readily be understood in the art.

The invention claimed is:

In a process for producing thiuram monosulfides which comprises reacting together at a temperature between 10° and 100° C., phosgene and a dithiocarbamic acid salt of the general formula

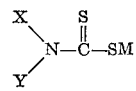

where
X is selected from the group consisting of alkyl and aralkyl,
Y is selected from the group consisting of alkyl, aralkyl and aryl, and
M is a radical selected from the group consisting of sodium, potassium and ammonium,
said phosgene being used in at least a stoichiometric amount required to react with said dithiocarbamic acid salt up to about a 25% by weight excess over stoichiometric, the improvement comprising, diluting said phosgene with at least 0.5 parts by volume of an inert aqueous diluent selected from the group consisting of air, nitrogen, carbon monoxide, neon and argon, per volume of phosgene.

References Cited in the file of this patent

UNITED STATES PATENTS

| | | |
|---|---|---|
| 2,048,043 | Williams et al. | July 21, 1936 |
| 2,830,060 | Ford | Apr. 8, 1958 |

FOREIGN PATENTS

| | | |
|---|---|---|
| 350,564 | Great Britain | June 15, 1931 |